United States Patent [19]

Tsao et al.

[11] Patent Number: 4,532,225

[45] Date of Patent: Jul. 30, 1985

[54] PREPARATION OF METAL-CONTAINING ZEOLITE CATALYSTS OF INCREASED STABILITY AND ACTIVITY

[75] Inventors: Ying-Yen P. Tsao, Langhorne, Pa.; Stephen S. Wong, Medford, N.J.

[73] Assignee: Mobil Oil Corporation, New York, N.Y.

[21] Appl. No.: 639,273

[22] Filed: Aug. 9, 1984

Related U.S. Application Data

[63] Continuation-in-part of Ser. No. 465,854, Feb. 11, 1983, Pat. No. 4,472,517.

[51] Int. Cl.$^3$ .......................... B01J 29/10; B01J 29/28
[52] U.S. Cl. ........................................ 502/62; 502/74; 502/77
[58] Field of Search ...................... 502/62, 74, 77, 78, 502/79

[56] References Cited

U.S. PATENT DOCUMENTS 3,200,083  8/1965  Milton .................................. 502/74

OTHER PUBLICATIONS

"Metal–Zeolite Catalysts" by Minachev et al., Zeolite Chemistry and Catalysis–Jule A. Rabo, ASC, Wash., D.C., 1976, pp. 555–573.
"IR Studie of Zeolite Surfaces" by John W. Ward, Zeolite Chemistry and Catalysis–Jule A. Rabo, ASC, Wash., D.C., 1976, pp. 197, 209, 214.

*Primary Examiner*—Carl F. Dees
*Attorney, Agent, or Firm*—A. J. McKillop; M. G. Gilman; J. F. Powers, Jr.

[57] ABSTRACT

A method of incorporating metals onto a crystalline aluminosilicate zeolite support comprises first depositing a metal which forms bonds with the zeolite and subsequently depositing a catalytically active metal into the zeolite which becomes associated with the first metal. The catalytically active metals may be introduced by decomposition of an organometallic complex which contains pi-electron donating ligands.

15 Claims, No Drawings

PREPARATION OF METAL-CONTAINING ZEOLITE CATALYSTS OF INCREASED STABILITY AND ACTIVITY

CROSS-REFERENCE TO RELATED APPLICATIONS

This application is a continuation-in-part of U.S. Ser. No. 465,854, filed Feb. 11, 1983, and which is now allowed (U.S. Pat. No. 4,472,517).

BACKGROUND OF THE INVENTION

1. Field of the Invention

This invention relates to a novel method of preparing metal-containing zeolite catalysts and to metal-containing zeolite catalysts of increased stability and activity prepared thereby.

2. Description of the Prior Art

Zeolitic materials, both natural and synthetic, have been demonstrated in the past to have catalytic capabilities for various types of hydrocarbon conversion. Certain zeolitic materials are ordered, porous crystalline aluminosilicates having a definite crystalline structure within which there are a large number of small cavities which are interconnected by a number of still smaller channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves include a wide variety of positive ion-containing crystalline aluminosilicates, both natural and synthetic. These aluminosilicates can be described as a rigid 3-dimensional network of $SiO_4$ and $AlO_4$ in which the tetrahedra are cross-linked by the sharing of oxygen atoms whereby the ratio of the total aluminum and silicon atoms to oxygen is 1:2. The spaces between the tetrahedra are occupied by molecules of water prior to dehydration. The electrovalence of the tetrahedra containing aluminum is balanced by the inclusion in the crystal of a cation, for example, an alkali metal or an alkali earth metal cation. This can be expressed by the formula wherein the ratio of Al to the number of the various cations such as Ca/2, Sr/2, Na, K or Li, is equal to unity. One type of cation can be exchanged either entirely or partially by another type of cation using ion exchange techniques in a conventional manner. By means of such cation exchange, it has been possible to vary the size of the pores in the given aluminosilicate by suitable selection of the particular cation.

The catalytic properties of metal-loaded aluminosilicates as is well known, have been demonstrated to be extremely important to petroleum, chemical and enzymatic reactions. The aluminosilicates have been activated, i.e., metal loaded for these reactions by methods employing impregnation, vapor deposition and base-exchange of the desired metal to be loaded. The use of aqueous solutions, especially those of polyvalent metal salts, is the standard method employed to exchange the metals into the crystalline aluminosilicate structure. The resulting wet metal-containing crystalline aluminosilicate zeolite is thereafter dried and subsequently subjected to a thermal treatment. The finished catalyst contains the metal component distributed in the zeolitic structure in metallic form.

Zeolites which have been loaded with metals according to the above-described conventional method are subject to substantial limitations. In particular, the metals incorporated in such zeolites may not be adequately anchored within the zeolite channels. Under the severe conditions of temperature and pressure encountered in catalysis, the incorporated metals migrate out of the pores of the zeolite to the zeolite surface. A reducing atmosphere and the presence of hydrocarbon exacerbates this migration.

Supported metal atoms are known to be bound to the support by Van der Waal's force, approximately 5 Kcal/g atoms. Increasing the number of metal atoms in a cluster results in an increase in the bonding energy of the metals to the support. Thus, metal atoms migrate easily to form clusters, especially at elevated temperatures when the mobility of these atoms is especially high.

Metal migration can be reduced by increasing the energy of interaction between the metal and the support. For example, it has been demonstrated that by using low valent metals, e.g. Pb or Sn, or early transition metals, e.g. Mo, W, Re, as a stabilizing center or anchored center or amorphous oxide supports such as $SiO_2$ and $Al_2O_3$, the binding energy between the metal atoms and the support, through the stabilizing center can be increased. An example of such a catalyst system can be represented as follows:

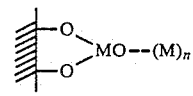

wherein Mo is the stabilizing center and M is the metal or metals being supported. It has been shown that metal to metal binding in bi-nuclear organometallic complexes can reach as high as 80 Kcal/mole.

The amorphous oxide supported metal catalysts with anchored center have also been shown to provide better metal dispersity and activity than the conventional metal-exchanged catalysts. For example, the activity for benzene hydrogenation was increased by 10 fold when Re or Mo was used as an anchored center for platinum metal. A more dramatic increase of $10^4$ fold in Pt activity for ethane hydrogenalysis was obtained with W as an anchored or stabilizing center on a $SiO_2$ support. Organometallic complexes, such as allyl complexes have been utilized to introduce both the stabilizing center and the catalytically active metal or metals within the support.

SUMMARY OF THE INVENTION

Among the principle objectives of this invention is to provide a method of incorporating metallic elements into the crystalline aluminosilicate zeolite structure and to produce thereby metal-containing zeolite catalysts of increased stability and activity. In accordance with the present invention, there has been discovered a new and improved method of preparing metal-loaded crystalline aluminosilicates suitable for use as catalysts in a wide variety of hydrocarbon conversion processes including hydrogenation, dehydrogenation, reforming, cracking, including hydrocracking, alkylation, isomerization, polymerization, dealkylation, dewaxing, olefinic production, among other possible hydrocarbon conversions. The method of preparing the metal-containing zeolite catalysts comprises first depositing a stabilizing or anchored center (a Group IVA metal or early transition metal) into the crystalline zeolite support and subsequently introducing the catalytically active metal or metals. The stabilizing center and the active metal or metals are introduced into the zeolite via the decomposition of organometallic complexes. It is believed that the strong bonding between the stabilizing center and the active metal or metals prevents metal migration even at elevated temperatures.

DESCRIPTION OF SPECIFIC EMBODIMENTS

The crystalline aluminosilicate employed in the preparation of the metal-containing catalyst compositions of the present invention are of ordered internal structure and have a pore size ranging between about 4 and 15 Angstrom units. They may be either natural or synthetic. Illustrative of preferred zeolites are faujasite, erionite, mordenite, chabazite, philipsite, gmelinite, zeolite X, zeolite Y, zeolite T, zeolite ZK-5, zeolites of the ZSM-5 family, including ZSM-5, ZSM-11, ZSM-12, ZSM-23, ZSM-35, ZSM-38 merely to list a few.

According to the invention, the method of incorporating an active metal or metals within the crystalline aluminosilicate structure comprises first depositing a stabilizing center into the zeolite support before introducing the active metal or metals. By utilizing the stabilizing center, the binding energy between the catalytically active metal atoms and the support, through the stabilizing center can be greatly increased. The stabilizing center can be selected from metals such as those from Group IVA, e.g., low valent lead or tin, or early transition metals of Groups IVB, VB, VIB and VII B, for example molybdenum, tungsten and rhenium.

The catalytically active metals which can be incorporated into the zeolite structure through the intermediate bonding of the stabilizing center include all metal elements contained in Groups I through VIII of the Periodic Table. Group VIII metals, in particular, are advantageously incorporated into the zeolite structure in accordance with the present invention. Group VIII metals are often used in hydrocarbon conversions at conditions with elevated temperatures and pressures and under a hydrogen environment, conditions which tend to increase metal migration during processing. The amount of catalytically active metal component incorporated within the crystalline structure of the aluminosilicate may vary widely and will depend upon the chargestock undergoing conversion as well as on the particular nature of the metal component. Generally, the amount of each metal component incorporated within the zeolite will be within the range of about 0.05 to 20 percent by weight. It will be understood that the amount of metal component will be such as to afford selective conversion of the portion of the charge mixture making contact with the active catalytic surfaces and undergoing conversion.

The stabilizing center and catalytic active metal or metals are preferably introduced into the crystalline structure of the aluminosilicate as organometallic complexes. The use of allyl complexes are particularly preferred, especially for introducing the stabilizing centers. Allyl complexes are preferred as the metal precursors for introducing the stabilizing center within the zeolite support for several reasons. Specifically, intrinsic in the use of allyl complexes are weak metal to ligand bonding. Additionally, extreme sensitivity of allyl complexes to hydrolysis such as by protonic acid and even through the weak hydroxyl protons on the surface of the support provides the chemicl bonding between the stabilizing center and the zeolite support. Allyl complexes are of small molecular diameter and thus can penetrate into the zeolite structure of even the small pore zeolites. It is also possible to introduce the catalytically active metal using metal allyl complexes.

Additionally, other organometallic complexes with small effective molecular diameters and with pi-electron donating ligands are useful to deposit the stabilizing center or, more preferably, the catalytically active metal.

The useful metal pi-complexes are broadly characterized by the presence of a central or nuclear metal atom having bonded thereto at least one ligand in the form of an organic group containing at least one carbon-to-carbon multiple bond. By virtue of the multiple bond, which is either a double or a triple bond, the group is bonded to the metal through the pi electrons of the bond, the resulting attachment being described as a coordinate covalent bond. The sigma electons of the multiple bond provide a carbon-to-carbon attachment described as a covalent bond. The unsaturated organic group is preferably an unsaturated hydrocarbon group, or one derived therefrom, i.e., a substituted unsaturated hydrocarbon group, and it preferably has two or more of said multiple bonds. The central metal atom is preferably platinum or palladium or other transition metal.

Usually, and as is preferred, the complex also contains one or more other ligands different from said organic group and which may be either anionic or neutral, and preferably singly charged, such as a halide ion. A specific illustrative complex is 1,5-cyclooctadiene-platinum (II) dichloride, the structure of which may be represented as follows:

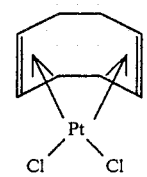

(I)

where the arrows represent coordinate covalent bonds linking the double bonds of the hydrocarbon moiety to the Pt, and the Cl atoms are connected to the Pt by covalent bonds. A convenient and illustrative way of defining the usual complexes is by means of the expression $$R_m M X_n \tag{II}$$

where R is the unsaturated organic group or ligand, M is the central metal atom, X is the anionic or neutral ligand described above as the "other" ligand, and m and n are integers.

As indicated, R is preferably an unsaturated hydrocarbon group, which may or may not be substituted by one or more substituents. Preferred unsaturated hydrocarbon groups are olefinic ligands derived from open chain diolefins having three to 24 carbon atoms, particularly unconjugated diolefins like 1,5-dienes, and including allene, butadiene, isoprene, pentadiene, hexadiene, heptadiene, diisobuteryl, decadiene, and the like. Other preferred unsaturated hydrocarbon groups are derived from open chain olefins having more than two double bonds, some times designated oligo-olefins, such as hexatriene, 2,6-dimethyl-2,4,6-octatriene, etc. Also preferred are cyclic diolefins and cyclic oligo-olefins, particularly unconjugated compounds like 1,5-cyclodienes, and including cyclobutadiene, cyclopentadiene, fulvene, norbornadiene, cyclooctadiene, dicyclopentadiene, 4-vinylcyclohexene, limonene, dipentene, cycloheptatriene, cyclooctatriene, bicyclo(2,2,2,)octa-2,5,7-triene, cyclonona-1,4,7-triene, cyclooctatetraene, and the like. Also useful are groups derived from heterocyclic di and oligo-olefins like "heterocyclopentadiene," which is intended to refer to all five-membered ring systems in which a hetero atom like phosphorus, oxygen, iron, nickel, cobalt, etc., replaced a methylene group of cyclopentadiene. Other suitable unsaturated hydrocarbon groups are derived from the acetylenes such as the hexadiynes, heptadiynes, octadiynes, 1,8-nonadiyne, 4,6-decadiyne, dodecatriyne, and the like. Unsaturated hydrocarbon groups having both double and triple bonds are of value, such as butenyne, 1,6-heptadien-3-yne. 3,6-dimethyl-2,6-octadien-4-yne, 1,7-octaenyne, etc. Or a mixture of an olefinic ligand and an acetylenic ligand of the foregoing types may be suitable.

It may be seen that R, the unsaturated hydrocarbon group, may have two or more double and/or triple bonds, and may have an open chain or cyclic structure. In some case, R may be an unsaturated cyclic or heterocyclic having one double bond, or it may be monoolefin having two or more carbon atoms such as that derived from ethylene, styrene, and the like; or it may be a monoacetylenic acetylene group; or an aromatic ligand like benzene or phenyl. It was also indicated that R may have various substituents, and these may include alkyl, aryl, alkoxy, halogen, carboxyl, ester, keto, and the like, it being understood that, as so substituted, the resulting substituted R group is capable of pi-electron bonding to the metal atom M.

In formula (II), the atom M is a metal. Metals which can be employed are the metals of Groups VIII, IB, IVB, VB, VIB, and VIIB.

Group X of formula (II) is preferably a halide like $Cl^-$, $Br^-$, $F^-$, and $I^-$. Other suitable groups are alkyl, acyl, amine, ammonia, acyloxy, alkyl sulfide, aryl sulfide, carbonyl, cyanide, isocyanide, hydrogen sulfide, nitrosyl, hydroxy, phosphine thiocarbonyl, thionitrosyl, and water. Also amide, aryloxy, aroyl, aroyloxy, alkoxy, hydride, hydrogen sulfite, thiocyanate, etc.

The group R in Formula (II) is an anionic group if it loses a proton; and if no proton is lost, it is treated as a neutral group. In computing the oxidation number of the central metal atom, the group R if anionic, is countered as negative; if neutral, it is counted as having zero charge.

The number of R and X ligands are denoted by the subscripts m and n; thus m may vary from 1 to 8, and n from 7 to 0, while their sum varies from 2 to 8. These variations, of course, are determined by the nature of the metal M and by its state of oxidation. The oxidation state of the metals as a group may range from 0 to 8, it being understood, as a glance at the periodic table will show, that some metals exhibit more oxidation states than others. It should be remembered that some ligands may have two bonds attached thereto. It will be seen that at least one R group is always present in formula (II). When n is 0, the formula becomes $R_mM$, where m may vary from 2 to 8; in complexes of this type, M is usually a metal of Group VIII or is chosen from chromium, titanium, rhenium, or vanadium.

Some illustrative complexes may be listed as follows.
1. dicyclopentadieneplatinum (II) dichloride
2. 1,3-butadienepalladium (II) dichloride
3. 1,3,5-cycloheptatrieneplatinum (II) dichloride
4. norbornadienepalladium (II) dibromide
5. 1,3,5,7-cyclooctatetraeneplatinum (II) dichloride
6. 2,5-dimethyl-1,5-hexadieneplatinum (II) dichloride
7. bis(pi-allylnickel iodide)
8. 1,5-cyclooctadienegold (III) trichloride
9. (1,7-octadiyne)platinum (II) dichloride A complex like No. 1 in the foregoing list may be prepared by adding dicyclopentadiene to Zeise's acid, $(H(C_2H_4PtCl_3)$, and refluxing for several hours, thereby to precipitate the complex. A complex like No. 2 may be prepared by using the method of Kharasch et al. JACS 60 882-4 (1938), as extended in Inorganic Synthesis VI 218-9, which involves using palladium (II) chloride as a starting material, reacting this with benzonitrile, and then reacting the resulting product with 1,3-butadiene. When carbonyl groups are present, as ligands, the corresponding metal carbonyl may be used as a starting compound and reacted with a suitable olefinic material. Other methods for preparing the complexes are available.

Other examples of metal pi-complexes and methods of preparation are illustrated in U.S. Pat. No. 3,635,761, which is herein incorporated by reference.

The organometallic complexes of the stabilizing center and catalytically active metal may be introduced into the zeolite after dissolving the complexes in a nonpolar organic solvent which includes alkane, aromatic or both. Pentane is a preferred solvent.

The following examples illustrate the preparation of metal-containing zeolites in accordance with the method of the present invention.

EXAMPLE 1

0.12 g of tetra-allyl molybdenum was dissolved in 20 ml of degassed pentane. 5 g of $NH_4ZSM$-5 (silica/alumina ratio 70) was converted to HZSM-5 by calcining at 500° C. for 2 hours. To this HZSM-5, the pentane solution of tetra-allyl molybdenum was added. The mixture stood for 16 hours. The brown solids were filtered, washed with $2 \times 10$ ml of degassed pentane, and dried in vacuum for 1.5 hours. These solids were then treated with 100 cc/min of $H_2$ at 600° C. for 3 hours. 0.27 g of bis-allyl palladium in 20 ml of degassed pentane was added to these $H_2$ reduced solids. After the pentane solvent was removed under vacuum, the resultant solids were reduced by 100 cc/min of $H_2$ at 600° C. for 2 hours. These final bimetallic solids were dark grey in color. The Mo and Pd metal loadings were 0.82% and 3.1%, by weight, respectively.

EXAMPLE 2

0.056 g of tetra-allyl molybdenum in 15 ml of pentane was added to 3 g of HZSM-Beta (silica/alumina ratio 150). The mixture stood for 16 hours. The light brown solids were filtered, washed with $2 \times 10$ ml of degrassed pentane, and then dried under vacuum for 2 hours. These solids were treated with 100 cc/min of $H_2$ at 600° C. for 3 hours to obtain purple color solids. To these solids, 0.133 g of dimethyl platinum cyclo-octadiene in 20 ml of pentane was introduced. The mixture stood for 2 days. After the removal of pentane under vacuum, the resultant black solids were analyzed for their Pt and Mo loadings which were found to be 2.6% and 0.69% respectively.

We claim:
1. A method of introducing a catalytically active metal into a crystalline aluminosilicate zeolite which comprises contacting said zeolite with a first organometallic complex of group IVA, group VIB or group VIIB metals to deposit said metal as a stabilizing center into said zeolite and subsequently contacting said zeolite with a second organometallic complex of said catalytically active metal, said second organometallic complex comprising pi-electron donating ligands, whereby said catalytically active metal is bound to said zeolite through said stabilizing center.

2. The method of claim 1 wherein said catalytically active metal is a group VIII metal.

3. The method of claim 1 wherein said first organometallic complex is a metal allyl complex.

4. The method of claim 3 wherein subsequent to introducing said metal allyl complex of said stabilizing center, the resulting zeolite is contacted with hydrogen to remove the organic ligands from said complex.

5. The method of claim 1 wherein said organometallic complexes of said stabilizing center and said catalytically active metal are introduced in said zeolite after dissolving said complexes in a non-polar organic solvent which includes alkane, aromatic or both.

6. The method of claim 5 wherein said organic solvent is pentane.

7. The method of claim 1 wherein said stabilizing center is low valent lead or tin.

8. The method of claim 1 wherein said stabilizing center is molybdenum.

9. The method of claim 2 wherein said catalytically active metal is platinum or palladium.

10. The method of claim 8 wherein said catalytically active metal is platinum or palladium.

11. The method of claim 1 wherein said zeolite comprises a zeolite of the ZSM-5 family.

12. The method of claim 1 wherein said zeolite comprises zeolite beta.

13. The method of claim 1 wherein said second organometallic complex of said catalytically active metal is represented by the formula $R_mMX_n$ wherein R is an unsaturated organic group, M is the catalytically active metal, X is an anionic or neutral ligand, m and n are integers which balance the oxidation state of said catalytically active metal.

14. The method of claim 13 wherein R is a cyclic diolefin.

15. The method of claim 14 wherein said second organometallic complex of said catalytically active metal is dimethyl platinum cyclo-octadiene.

* * * * *